United States Patent Office 3,598,884
Patented Aug. 10, 1971

3,598,884
CROSS-LINKING OF POLYMERS
Yung-Kang Wei, Sarnia, Ontario, Canada, assignor to Polymer Corporation Limited, Sarnia, Ontario, Canada
No Drawing. Filed July 12, 1968, Ser. No. 744,301
Claims priority, application Canada, Aug. 4, 1967, 997,079
Int. Cl. C08f 27/00
U.S. Cl. 260—876         5 Claims

ABSTRACT OF THE DISCLOSURE

Cross-linked block copolymeric materials with good elastomeric properties are prepared by mixing block copolymers having one reactive chain end, with block copolymers having at least two reactive chain ends, preferably in solution, and adding a coupling agent which has at least three reactive sites capable of reacting with the reactive block copolymeric chain ends.

---

This invention relates to a process of producing cross-linked block copolymeric materials. More specifically it relates to a process of reacting terminally reactive linear block copolymers to produce a polymeric material having a limited number of cross-links between the polymeric chain.

The invention has been primarily developed in connection with "living" polymers, i.e. polymers produced by anionic polymerization of one or more monomers using an alkali metal or an organic compound of an alkali metal as initiator. Such polymers produced in the absence of materials containing active hydrogen have ionically charged (or "live") ends, with which the alkali metal residue of the initiator is associated. They can initiate further polymerization of additional monomer charges added thereto. An example of such a living polymer is polystyrene prepared in solution in benzene under anhydrous and oxygen-free conditions using butyl lithium as initiator. When all the monomeric styrene has polymerized, the polystyrene remains active and will initiate the polymerization of a further charge of styrene onto the end of the already formed polystyrene. Alternatively, it will initiate the polymerization of a charge of another monomer such as butadiene to form a styrene-butadiene block copolymer. Provided the block copolymer is not deactivated, this procedure can be repeated to form multi-block copolymers.

Also, such polymers may be produced having two live ends by using a difunctional anionic initiator such as di-lithium-diisoprene. If a further charge of a different monomer is added to such a difunctional living polymer, the monomer will polymerize onto both ends, so forming a three-block copolymer.

This living polymer method is the basis for preparation of styrene-butadiene and the like block copolymers which have recently assumed considerable importance. These block copolymers, having the configuration polystyrene-polybutadiene-polystyrene, have some of the properties of both a thermoplastic and an elastomer, and do not need curing in order to develop such properties. Such materials are commonly prepared by the living polymer method outlined above, using a first charge of styrene and a monofunctional initiator such as butyl lithium, followed by subsequent charges of first butadiene and then styrene. Alternatively a first charge of butadiene and a difunctional initiator may be used, followed by a single subsequent charge of styrene. A third method involves the preparation of a polystyrene-polybutadiene living two-block copolymer with a monofunctional initiator, and the subsequent addition of a simple coupling agent such as carbon dioxide. The coupling agent links two-block copolymer molecules together through their live ends, to give a block copolymer of general form polystyrene-polybutadiene-X-polybutadiene-polystyrene, where X represents the residue of the coupling agent. Thermoplastic rubbery block copolymers of butadiene and styrene and similar monomers generally have a plastics content of from 25 to 75 weight percent, and an overall molecular weight of from about 40,000 to 150,000.

Other monomers which are useful in place of butadiene include isoprene, piperylene, dimethyl-butadiene and the like. Other monomers which can replace styrene include vinyl toluenes, vinyl pyridines, vinyl polycyclic aromatic compounds, alkyl substituted styrenes, certain acrylates, and the like.

These block copolymers of general form polystyrene-polybutadiene-polystyrene or polystyrene-polyisoprene-polystyrene, whilst exhibiting many of the desirable properties of an elastomer without curing, have some disadvantages. One of these is that they yield at a certain elongating stress. When a stress is applied the materials elongate substantially in proportion to the stress when small stresses are applied, and on release the materials rapidly recover their original length. However, at a certain stress value the polymer yields a small increase in stress over this certain value causing a large elongation, and the material only recovers slowly on release of the stress due to its very small restoring force. The materials are therefore of little use as elastomers at or around such stress values. This is in contrast to conventional cured rubbers, which exhibit strong restoring forces at all stages of elongation up to their breaking point.

It has now been discovered that thermoplastic elastomers in which this yielding phenomenon is substantially reduced or even eliminated may be prepared by a mixed coupling process involving polymers having different numbers of live ends on the block copolymeric chains. It has been found that when a living polymer having one live end is mixed with a living polymer having two live ends, and a coupling agent having at least three reactive sites is added to the mixture, a thermoplastic rubbery polymer is formed which has improved rubbery properties.

A suitable example of a useful polyfunctional coupling agent is silicon tetrachloride. Theoretically this compound has four reactive sites capable of reacting with lithium terminated living block copolymers. If this compound is added to a solution of living block copolymer having only one live end, theoretically four polymer chains would attach to each silicon atom, to give a radial polymer having four chains radiating from the silicon atom in the center. The reaction would result in a deactivated polymer, lithium chloride being formed as a by-product. This appears to be close to what happens in practice, if the calculated amount of silicon tetrachloride, based on living polymer ends present is added. If however, this compound is added to a solution of a block copolymer having two live ends on each polymeric chain, a completely cross-linked polymeric network will result. The chemical reaction would be essentially the same as in the case of the monofunctional material, but each end of a polymer chain would be linked to a silicon atom to form a network. Such a material does not exhibit the desirable properties of a thermoplastic rubber.

By the process of the present invention however, an intermediate situation is achieved. A mixture of monofunctional living polymer and difunctional living polymer is treated with the coupling agent. Only the difunctional living polymer will react to introduce cross-links into the resulting polymeric material. Whilst the monofunctional living polymer will react and link to a silicon atom at one end, it will not provide cross-links. The amount of cross-linking in the resultant polymer will be controlled by the relative proportions of monofunctional and difunctional living polymer which is used.

As will be shown in the specific examples included herein, it is possible by the process of the invention to prepare thermoplastic rubbers having a variety of physical properties by varying the relative amounts of polymers used. As the proportion of monofunctional living polymer is increased, the number of cross-links in the final product is reduced, and the yielding phenomenon referred to previously becomes more pronounced, as shown by the low modulus figures. As the proportions of difunctional living polymer is increased, the yielding phenomenon is markedly decreased. However, the elongation at break is also reduced as the number of cross-links is thus increased. By choosing the right intermediate proportions however, one can strike an admirable balance between these two properties, and produce a thermoplastic rubber having eminently satisfactory properties in this respect.

The preferred manner of carrying out the process of the invention as applied to living block copolymers is to prepare the respective monofunctional and difunctional living polymers in separate solutions in an inert solvent such as benzene. Whilst both of these block copolymers are normally derived from the same monomers, it is within the scope of the invention to use different block copolymers as the monofunctional and difunctional polymers. Given amounts of these solutions, the concentrations of which are known, are then mixed. To the common solution thus formed, the coupling agent is added, conveniently in liquid form, and the mixture agitated to ensure thorough mixing. When silicon tetrachloride is used as the coupling agent, it is conveniently added as a solution in an organic solvent compatible with the solvent in which the living polymers are dissolved. The amount of coupling agent to be added is based upon the number of live polymer ends present and the functionality of the coupling agent. Thus with silicon tetrachloride, a quadrifunctional reactant, one mole is added per four live ends to effect the most efficient coupling. A slight excess of coupling agent is not harmful, but a large excess of coupling agent is liable to terminate the polymer chains without effecting coupling of them.

Suitable monofunctional initiators of anionic polymerization for preparing the monofunctional living block copolymers include methyllithium, isopropyl lithium, n-butyl lithium, sec butyl lithium, tertiary octyl lithium, n-decyl lithium, phenyl lithium and naphthyl lithium. Sodium compounds such as sodium alkyls, sodium naphthalene and sodim alphamethylstyrene tetramer are also useful. Suitable difunctional initiators of anionic polymerization for preparing the difunctional block copolymers include dilithium-diisoprene, dilithium-stilbene, dilithium-methane, 1,4-dilithium-butane, and the like. It is of course preferred that both the monofunctional and the difunctional polymers be prepared in the same solvent, or at least in mutually compatible solvents, so as to facilitate mixing of the solutions.

It is important that at all stages until after the reaction with the coupling agent is complete, precautions should be taken to prevent premature killing of the living polymers. Thus the polymerization and coupling should be carried out under oxygen free and anhydrous conditions. Precautions should be taken to prevent contamination of the solutions with materials containing active hydrogen, which if present will kill the polymer.

Both living block copolymers are conveniently prepared in solution in a hydrocarbon solvent such as benzene, polymerization being effected at a temperature around 50° C.

After the required monofunctional and difunctional living polymers have been formed, measured quantities of the solutions of them are mixed together and the coupling agent is added. The coupling reaction can conveniently take place at the same temperature as that at which the living polymers are prepared, i.e. about 50° C. When using silicon tetrachloride as the coupling agent it is convenient to add the coupling agent as a dilute solution in benzene. It is important that silicon tetrachloride should be kept out of contact with water since it is readily hydrolized with evolution of hydrochloric acid, which can have a deterimental effect on the block copolymers. The solution should be agitated during and after the addition of the silicon tetrachloride to ensure thorough mixing. The coupling reaction generally takes from about 15 minutes to one hour to complete. The resultant polymeric products may then be extracted from solution, by precipitation with an excess of alcohol and recovered. It is convenient to add a small amount of an antioxidant to the polymer at the recovery stage.

In an alternative procedure it is possible to prepare a mixture of monofunctional and difunctional living block copolymers initially in the same solution. This is done by firstly charging styrene to the solution and then adding a mixture of monofunctional initiator and difunctional initiator. After complete polymerization of the styrene, butadiene may be added and polymerized, resulting in the formation of a mixture of *polybutadiene-polystyrene and *polybutadiene-polystyrene-polybutadiene* (where * denotes the live ends). A multifunctional coupling agent may then be added to this mixed solution. The relative amounts of monofunctional and difunctional polymers is controlled by the relative amounts of monofunctional and difunctional initiators added.

The block copolymers produced by the process of the present invention preferably have a plastics content (e.g. styrene content) of from 25–70 wt. percent. Each polystyrene or the like block of each polymer to be coupled preferably has a molecular weight of from 10,000 to 20,000, and each diene block preferably has a molecular weight of from 30,000 to 100,000.

The invention as applied to the preparation of thermoplastic rubbery block copolymers will be more particularly described with reference to the following specific example.

EXAMPLE

In this example, a first masterbatch of monofunctional polystyrene-polybutadiene block copolymer solution was prepared, a second masterbatch of difunctional living polystyrene-polybutadiene-polystyrene block copolymer was prepared, and then portions of the two masterbatches were mixed and silicon tetrachloride coupling agent added.

The first masterbatch was prepared using 1,500 mls. of reagent grade benzene as solvent. To this solvent was charged 9.0 mls. of a 1.2 molar solution of sec. butyl lithium, in benzene, followed by 150 mls. (135 grams) of monomeric styrene. All reagents, polymerization vessels, etc. were of course carefully dried and purified before use. Polymerization proceeded at 50° C. for 45 minutes, at the end of which time all the monomeric styrene had polymerized. The solution at this stage contained monofunctional living polystyrene. 300 mls. (189 grams) of butadiene-1,3 was then charged to the polymerization vessel, and polymerization proceeded for a further two hours at 50° C. The solution then contained a monofunctional living two-block copolymer of general form polystyrene-polybutadiene *, containing 41 weight percent of styrene.

The second masterbatch was prepared using 1,500 mls. of reagent grade benzene, to which was charged 25 mls. of a 1.2 molar (with respect to lithium) benzene solution of dilithium-diisoprene. 300 mls. (189 grams) of butadiene-1,3 was then charged and polymerization proceeded under the same conditions as those used in preparing the first masterbatch, for a period of two hours. To the solution of difunctional living polybutadiene so formed, 150 mls. (135 grams) of styrene was added and polymerization allowed to proceed for a further 1½ hours. This solution then contained a difunctional living three-block copolymer of general form *polystyrene-polybutadiene-polystyrene*, containing 41 weight percent of styrene, as in the first masterbatch.

A portion of each masterbatch was then extracted and mixed together. To the mixture so formed was added a measured volume of an 0.5 molar solution of silicon tetrachloride in benzene. The amount of silicon tetrachloride solution added was sufficient to give approximately one mole of silicon per four polymer live ends in the mixture. The mixture was agitated during and after addition of the silicon tetrachloride. The temperature of the mixture during this operation was about 50° C. After a period of about one hour, the mixture was cooled and the polymer precipitated by addition of excess ethanol. A small amount of a conventional antioxidant (Deenax) was also added at this stage. The polymers so recovered were filtered off, dried, pressed and subjected to physical tests.

A series of such experiments were carried out using different relative amounts of solution from the first and second masterbatches, and correspondingly different amounts of silicon tetrachloride were added to keep the silicon to lithium molar ratio approximately the same. In one pair of experiments (B and C) the only difference was a change in this silicon to lithium ratio, to see if the presence of a small excess of silicon tetrachloride had any significant effect.

The stress-strain measurements were carried out on pressed films of the products. Micro-dumbells of thickness 0.025 inch and width 0.10 inch were cut from the dried, pressed films and subjected to strength tests using an Instron Tester, in the manner well-known in the rubber art. Also the solubility of the polymers in toluene at 30° C. and the intrinsic viscosity of polymers, were measured.

The experiments using proportions of the masterbatch solutions, in accordance with the invention, are recorded in the table below and designated experiments A, B, C and D.

For comparison purposes portions of each masterbatch solution were treated separately with the silicon tetrachloride solution in the same manner. The products were extracted and tested in the same way. These controls are designated experiments E and F in the table.

Also for comparison purposes, the polymeric materials obtained from experiments E and F were blended in equal parts by weight, by coprecipitation from solution. The blend so obtained was recovered and tested in the same way. The blend is designated experiment G in the table.

applications. The modulus figures however are very low and indicate the presence of the yielding phenomenon discussed previously. It should be particularly noted that the difference between the values for 100% modulus and 300% modulus is very small. Little force is required to extend the polymer from 100% elongation to 300% elongation, indicating that the polymer has yielded.

Control experiment F however, which coupled difunctional living polymers only, gave a polymer deficient in different properties. This polymer had a very satisfactory 100% modulus, but its elongation at break and solubility are unsatisfactory for practical use. Control experiment G shows that a satisfactory compromise of physical properties cannot be achieved by a simple blending of the two products obtained from experiments E and F. The resultant mixed polymer shows a deterioration in tensile strength and elongation at break.

The intrinsic viscosity shows a considerable increase on addition of the coupling agent, indicating that a coupling reaction takes place.

Experiments A, B, C and D which were in accordance with the present invention, show a practical compromise of physical properties. Thus the moduli of the products of these experiments are much improved over that from experiment E, and the elongations at break and solubilities are a considerable improvement over those from experiments F and G. The products of experiments A and B are particularly attractive from a practical point of view. It will also be noted that the properties of the resultant polymeric materials can be achieved over a considerable range, by regulation of the relative amounts of monofunctional polymer and difunctional polymer which is used, and the relative amounts of coupling agent which is added.

Whilst the invention has been particularly described with reference to the coupling of living polymers with silicon tetrachloride as the coupling agent, it will be appreciated that there are many other coupling agents which could be used. The requirements are that the coupling agent should have at least three sites capable of reacting with the reactive ends of the polymers. Other examples of classes of suitable coupling agents include polyglycols, polyamines, polyaldehydes, polyepoxides such as 1,2; 5,6; 9,10-triepoxy-decane, polyketones such as 1,3, 6-hexanetrione, polyhalides such as silicon tetrabromide, trichlorosilane, 1,3, 5-tri(bromo-methyl)benzene, and reagents having more than one type of reactive site, such as 1,3-dichloro-2-propanone.

Similar useful results may be obtained by practising the invention on polymers or block copolymers produced in emulsion systems, provided that such polymeric ma-

TABLE

| Experiment | A | B | C | D | E | F | G |
|---|---|---|---|---|---|---|---|
| Volume of masterbatch (mls.): | | | | | | | |
| 1 | 200 | 200 | 200 | 200 | 400 | | ¹ 8 |
| 2 | 100 | 200 | 200 | 300 | | 400 | ¹ 8 |
| Volume of SiCl₄ solution (mls.) | 1.2 | 2.0 | 2.5 | 3.0 | 0.8 | 4.0 | |
| [η] Of resultant polymers | 1.436 | 1.484 | 2.276 | 1.613 | 0.928 | 1.261 | 1.048 |
| Percent solubility | 95.8 | 98.4 | 98.3 | 100 | 98.8 | 77.5 | 85.5 |
| Tensile at break (kg./cm.²): | | | | | | | |
| 25° C | 141.6 | 104.1 | 116.7 | 112.6 | 150.8 | 112.5 | 64.5 |
| 60° C | 64.7 | 46.3 | 66.4 | 75.5 | 58.0 | 62.9 | 37.3 |
| Percent elongation at break: | | | | | | | |
| 25° C | 700 | 520 | 210 | 270 | 950 | 140 | 110 |
| 60° C | 670 | 330 | 230 | 280 | 980 | 110 | 120 |
| 100% modulus (kg./cm.²): | | | | | | | |
| 25° C | 54.0 | 50.0 | 86.0 | 83.5 | 24.2 | 88.4 | 60.5 |
| 60° C | 30.2 | 30.7 | 49.3 | 41.5 | 17.7 | 58.1 | 34.5 |
| 300% modulus (kg./cm.²): | | | | | | | |
| 25° C | 79.4 | 76.2 | | | 27.1 | | |
| 60° C | 47.5 | 45.0 | | | 19.8 | | |

¹ Grams dry rubber.

From the table, it will be noted that control experiment E, which involved the coupling of monofunctional living polymer, gave a polymer having high tensile strength, high elongation at break, but very low modulus. Indeed the tensile strength and elongation at break values are considerably higher than necessary for most practical terials have reactive end groups. The coupling agent in such cases must of course be one which has at least three sites which are capable of reacting with end groups on the polymers.

The products are useful for making injection moulded goods, shoe soles, as adhesives, etc.

What is claimed is:
1. A process of preparing improved thermoplastic rubbery block copolymers which comprises preparing a first living block copolymer by polymerization of a conjugated diolefinic hydrocarbon monomer and a vinyl aromatic hydrocarbon monomer in solution using a monofunctional anionic polymerization initiator, preparing a second living block copolymer by the polymerization of a conjugated diolefinic hydrocarbon monomer and a vinyl aromatic hydrocarbon monomer in solution using a difunctional anionic initiator, mixing the solutions of the two non-deactivated block copolymers, adding to the mixed solution so formed a coupling agent having at least three reactive sites selected from silicon tetrachloride, silicon tetrabromide and trichlorosilane, allowing said coupling agent to react with the living block copolymers and recovering the resultant polymeric material having reduced yield properties when a stress is applied.

2. The process of claim 1 wherein the monofunctional anionic polymerization initiator is a monolithium hydrocarbon.

3. The process of claim 2 wherein the difunctional anionic polymerization initiator is a dilithium hydrocarbon.

4. The process of claim 3 wherein the first block copolymer is a two block copolymer prepared by polymerizing firstly a vinyl aromatic hydrocarbon monomer and secondly a conjugated diolefinic hydrocarbon monomer, and the second block copolymer is a three block copolymer prepared by polymerizing firstly a conjugated diolefinic hydrocarbon monomer and secondly a vinyl aromatic hydrocarbon monomer.

5. The process of claim 4 wherein said vinyl aromatic hydrocarbon is styrene and said conjugated diolefinic hydrocarbon is butadiene or isoprene.

References Cited
UNITED STATES PATENTS

| | | | |
|---|---|---|---|
| 3,078,254 | 2/1963 | Zelinski et al. | 260—880 |
| 3,135,716 | 6/1964 | Uraneck et al. | 260—880 |
| 3,150,209 | 9/1964 | Short et al. | 260—876 |
| 3,177,190 | 4/1965 | Hsieh | 260—880 |
| 3,468,972 | 9/1969 | Hsieh | 260—827 |

SAMUEL H. BLECH, Primary Examiner

U.S. Cl. X.R.

260—827, 836, 879, 880